3,353,081
APPARATUS FOR PRODUCING FREQUENCY AND AMPLITUDE DEPENDENT CONTROL VOLTAGES
Herbert Stemmler, Baden, Switzerland, assignor to Aktiengesellschaft Brown, Boveri & Cie., Baden, Switzerland, a joint-stock company
Filed Mar. 8, 1965, Ser. No. 437,893
Claims priority, application Switzerland, Mar. 20, 1964, 3,598/64
6 Claims. (Cl. 321—6)

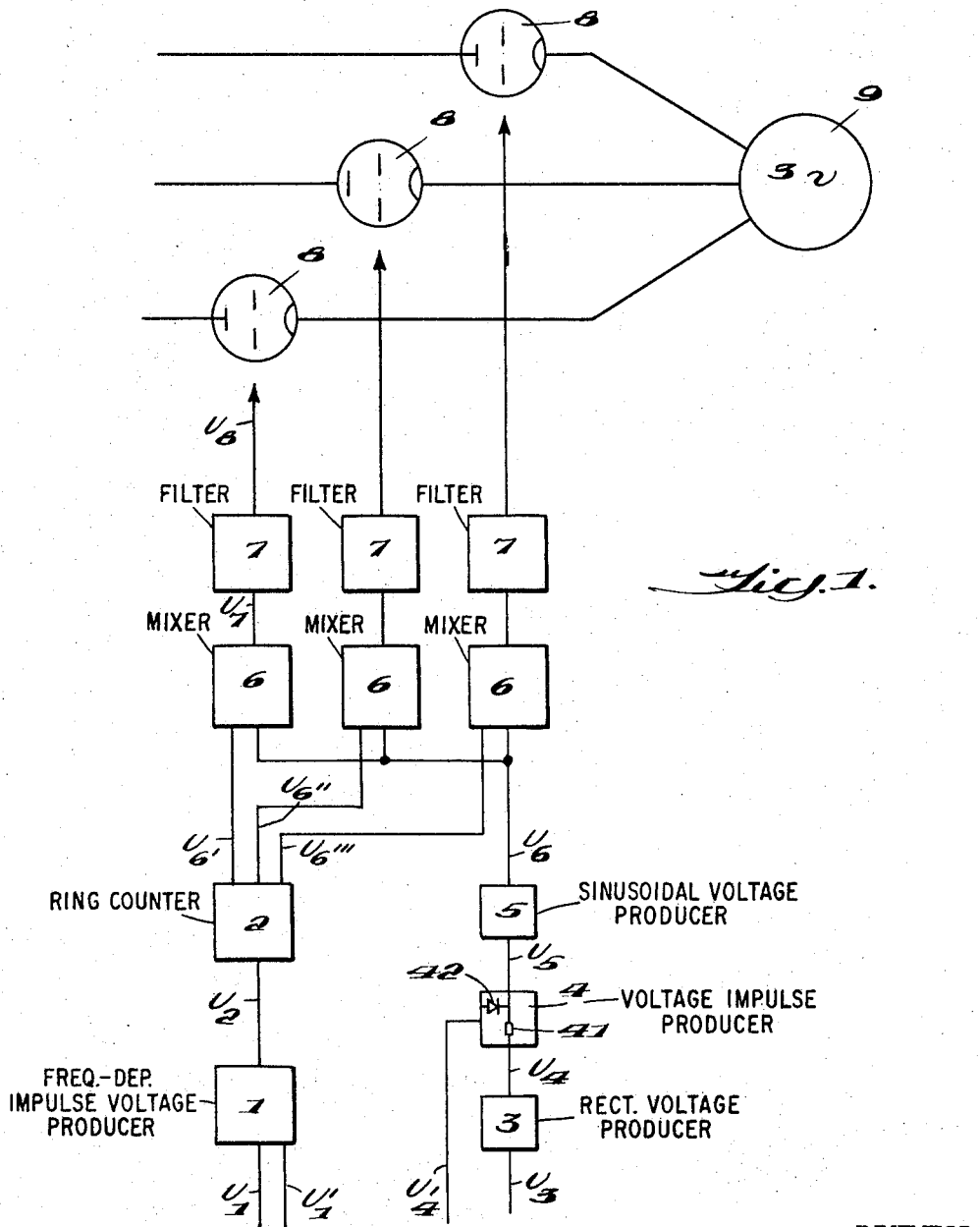

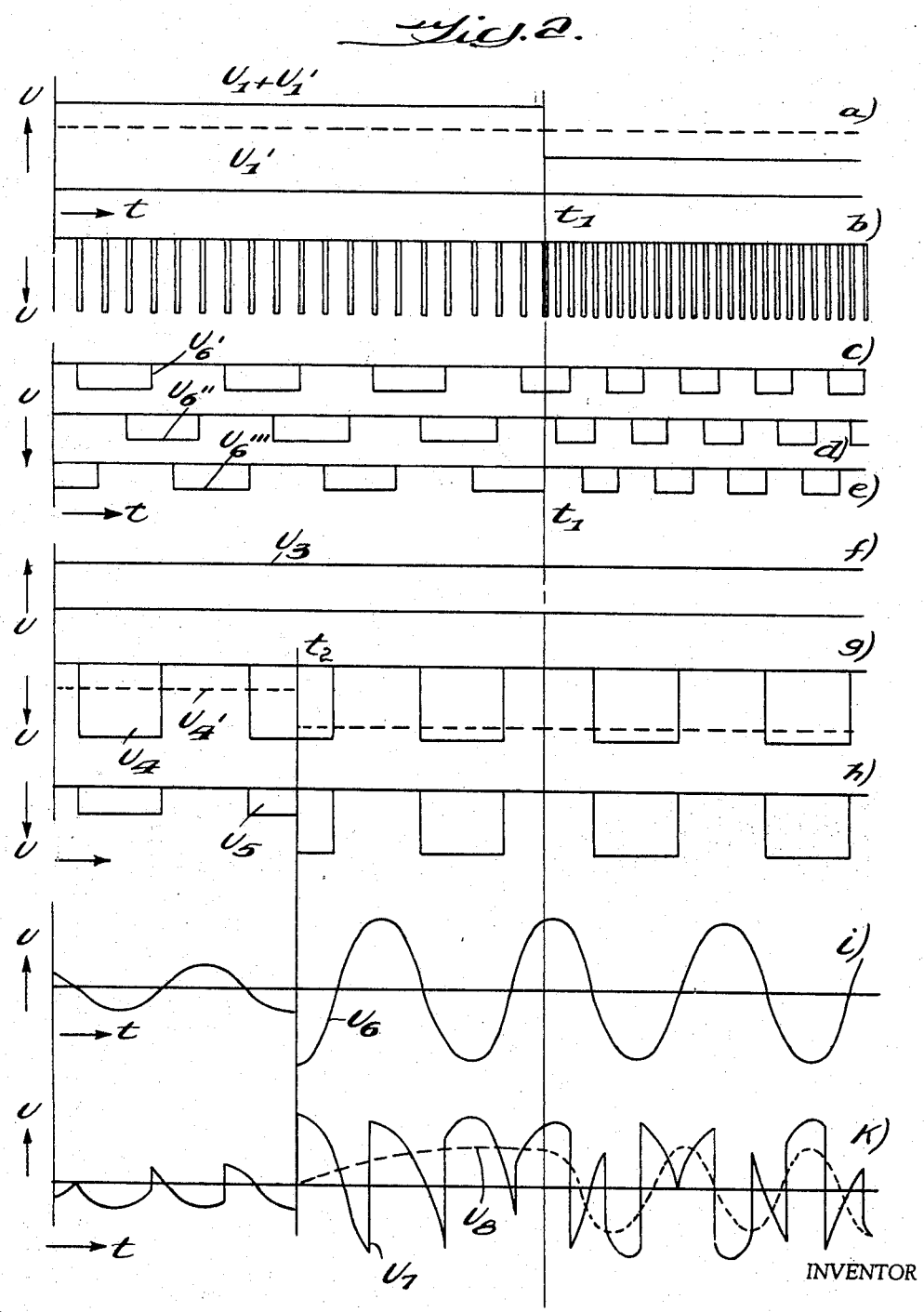

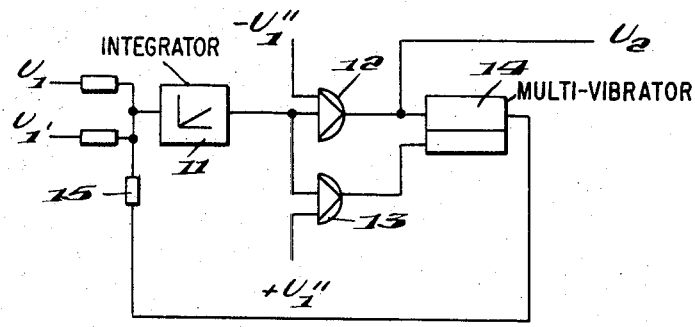
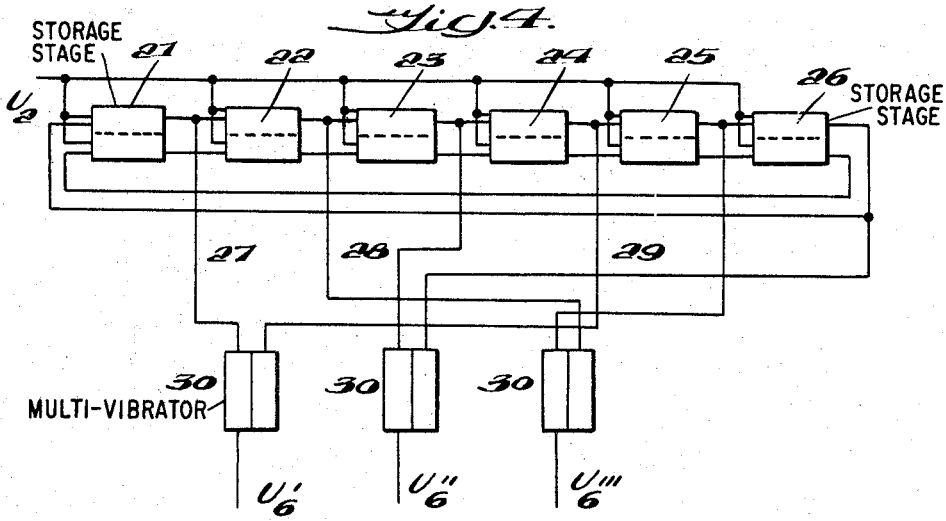
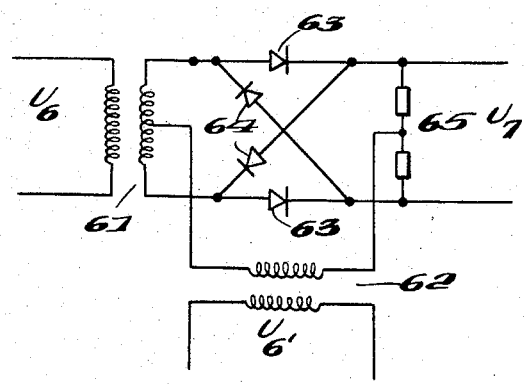
INVENTOR
Herbert Stemmler
BY Pierce, Scheffler & Parker
ATTORNEYS United States Patent Office 3,353,081
Patented Nov. 14, 1967

ABSTRACT OF THE DISCLOSURE

An arrangement for producing frequency and amplitude dependent control voltages comprises a unit which produces a first series of rectangular voltage impulses which have a constant amplitude but variable frequency. These impulses are transformed into a $n$ number of voltage impulses displaced in phase by $360/n$ which thus forms a rotary field voltage. Another unit produces a second series of rectangular voltage pulses which have a constant frequency but variable amplitude and these impulses are transformed into a single-phase sinusoidal voltage of the same constant frequency and variable amplitude. This sinusoidal voltage is then mixed with each of the phase-displaced rotary field voltages to form an $n$-phase sinusoidal control voltage having a variable amplitude and a variable frequency equal to the difference between the respective frequencies of the single-phase sinusoidal voltage and the rotary field voltage.

---

The present invention is directed to apparatus for producing control values and in particular to an improved, electronically operating apparatus for producing control values in the form of voltages, which are frequency and amplitude dependent, for use with rotary field-dependent electrical apparatus. The invention is particularly applicable for the control of commutator-less three-phase motors which are supplied with current over controllable inverters. These motors must be controlled both as to speed and direction of rotation and the improved apparatus provides control voltages for this in a manner not achieved with prior apparatus developed for this purpose.

The control voltage formed in apparatus of this general type is fed as a control voltage to the inverters which supply such a motor. The nominal voltage can also be compared with an actual voltage, in which case the difference is determinant for the control of the speed. The variable frequency of the speed transmitter varies the speed of the motor. The variable amplitude of this transmitter influences the voltage of the motor. The speed control is important for starting the motor and for drives with variable speed, where the direction of rotation is also reversed. The voltage must be variable, since the magnetization of the iron increases at lower frequencies, so that saturation phenomena can appear at excessive voltages. For this reason the voltage must likewise be reduced at lower speeds and lower frequencies.

For the production of such a rotary field with variable frequency and variable amplitude have been used up to now three-phase generators with commutators. In synchronous generators, the amplitude is determined in known manner by the intensity of the exciter current and the frequency by the speed. Commutator-free generators, also asynchronous generators, cannot be used here, because there is practically no amplitude at low frequencies. In reversing drives, however, it is sometimes necessary to maintain a sufficient regulability of the voltage even at the frequency zero.

Arrangements are also known which are provided with direct current fed potentiometers whose tap is moved mechanically or electrically with sinusoidally varying speed. The speed determines then the frequency, and the topmost point of the potentiometer reached during the movement determines the amplitude.

The disadvantage of all these arrangements is that they have moving parts.

The problem is therefore to obtain the production of a frequency-variable and amplitude-variable rotary field transmitter with static means.

According to the invention it is therefore suggested that a time-signal transmitter be used which generates impulses from a variable D-C voltage whose frequency is proportional to this D-C voltage and that a ring counter be provided which transforms this voltage into $n$ voltages, displaced by $n/360$ and forming a rotay field, the so-called rotary field voltage, and that another time signal transmitter be provided which transmits an oscillator voltage with constant frequency to an amplitude limiter with filter circuit, which makes the amplitude of the oscillator voltage by means of a variable D-C voltage likewise variable, producing a sinusoidal single-phase voltage with constant frequency and variable amplitude, and that a mixing member is provided to which the rotary field voltage and the single-phase voltage are fed and at whose three-phase output are formed voltages of variable frequency and variable amplitude, this frequency being the difference between the frequencies of the rotary field voltage and of the single-phase voltage.

The accompanying drawings represent various embodiments of the subject of the invention.

FIG. 1 shows the principal form of the circuit as a block circuit diagram.

FIG. 2 (plots $a$ to $k$) shows the method of operation of the circuit in diagrams.

FIGS. 3 to 5 show individual circuits of the blocks.

With reference now to FIG. 1, the three-phase commutator-free motor 9 is fed over the inverters 8, which are only indicated by simple rectifier vessels. The rotary field transmitter is indicated by the individual blocks 1 to 7. Block 1 transforms the arriving D-C voltage U1, which is variable, into a frequency-dependent impulse voltage. To this block is also fed the fixed D-C voltage U1'. At the output appears an impulse voltage whose impulse frequency varies according to the size of U1. The impulses formed can be seen in FIG. 2 in diagram $b$. If only the voltage U1' is present, an impulse frequency is formed which is, for example, 300 c.p.s. The voltage U1 is now added to the voltage U1'. If U1 is positive, a higher voltage is formed and the frequency is reduced. If U1 is negative, however, the frequency is increased. If U1 is zero, a frequency will be formed which corresponds to the stopped motor, as it will be shown later. The frequency range is so selected that the full speed can be achieved in both directions. Since the frequency of the motor is 50 c.p.s. as a rule, it suffices to make the voltage U1 so high that the frequency just varies between 350 and 250 c.p.s.

The impulses U2 are now fed to block 2, which represents a ring counter. In this ring counter the arriving voltage U2 is distributed to three outputs U6', U6″ and U6‴ by means of a shift register, as it will be shown later. These voltages are rectangular and are produced by the impulses U2, one impulse releasing the rectangular voltage, and another impulse blocking it. It is always every third impulse that effects the release and the blocking. The other impulses between these impulses are used for the rectangular voltage of the other phases. These too are released and blocked by every third impulse. One sees that the rectangular voltages depend both in their frequency and in their breadth on the impulse frequency of the supply voltage U2. This can be seen from diagrams c, d and e of FIG. 2. The frequency of the impulses is varied at point t1, and one sees the variation of the rectangular voltages.

In block 3 is produced a rectangular voltage which is determined by the constant D-C voltage U3. This rectangular voltage has the fixed frequency 300 c.p.s. in the example assumed and is so designed that the gaps of the voltage last exactly as long as the voltages of the impulses themselves. The supply voltage U3 is shown in diagram f of FIG. 2; the voltage U4 formed at the output can be seen in FIG. 2g. To the block 4 is also fed an amplitude-variable D-C voltage U4', which is indicated by broken lines in FIG. 2g. At the point t2, the amplitude of this voltage is changed in order to be able to observe the influence of the amplitude variation. In block 4 is formed at the output a voltage which is designated with U5 and represented in FIG. 2h. In block 4 the voltage U4' is only transmitted if the voltage U4 is present. This yields the form of the voltage U5. One sees that the voltage impulses U5 thus formed have different heights, depending on the height of the supply voltage U4'. The height of the voltage U4' is changed at the point t2. The voltage U5 is now fed to block 5, which produces from this voltage a sinusoidal curve fluctuating about a mean value zero. One sees that up to the point t2 the sine curve has a smaller amplitude than after t2. This can be seen from FIG. 2i. The output voltage of block 5 is designated with U6. These voltages are fed to the three mixing members 6. These mixing members correspond to the three phases of the rotary field to be produced. FIG. 2k shows the interaction of the voltage U6' and of the voltage U6. Similar considerations hold true for the other phases. This mixing member works so that the sine curve U6 is transmitted in the indicated manner in the presence of a voltage U6'. The block 6 has thus a gate circuit. If there is no voltage U6', the negative value of the voltage U5 passes through the gate. One thus obtains the curve U7. The amplitude of the voltage U6 varies at the point t2, so that the curve U7 is correspondingly increased. The frequency varies at the point t1, and one sees clearly that the frequency of the output voltage U7 is also changed by it. The voltage U7 formed at the output of 6 is here already a strong-waved sine curve. Its frequency is formed from the sum and the difference of the frequencies of the voltages U6 and U6'. Important for the regulation is to obtain the differential frequency since the voltage U6 has the value 300 c.p.s. and U6' a value differing from it by ±50. At the output is then formed a voltage with a frequency varying between +50 and −50. This voltage is only then filtered out in the blocks 7, so that a pure sine curve is obtained.

FIG. 3 shows the method of operation of block 1. The two supply voltages U1 and U1' are first applied to an integrator 11. The latter has a condenser in which the voltage increases gradually, depending on how long the supply lasts. The increasing voltage formed in this integrator is fed to diode 12. The latter is at first blocked by the voltage −U1'. When the supply voltage attains this value, the diode becomes conductive and transmits an impulse to a multivibrator 14. This multivibrator thus tips and produces at its output a voltage which is returned again over resistance 15 to the integrator. This voltage effects the discharge of the condenser in the integrator 11, so that the voltage drops again. The diode 12 thus blocks again. Since the multivibrator 14 maintains its voltage, the voltage continues to drop until the diode 13 to which the value +U1 is fed, can ignite and it ignites when the negative voltage in the integrator 11 has attained this value. In this case the multivibrator tips back again and the feedback voltage at the resistance 15 stops. The cycle thus starts again. The output voltage U2 corresponds then to the impulse which has tipped the multivibrator 14, and the latter appears whenever the multivibrator is tipped. The frequency of these impulses is determined by the fact that the voltage fed to the integrator is higher or lower. If the voltage is less than U1', the tipping point is reached later than if the voltage U1' is greater than U1. The discharge, in contrast, is delayed by the negative feedback, since the latter must compensate the supply voltage. The higher the supply voltage, the longer must the negative feedback act until the lower limit of the discharge of the condenser in the integrator is reached. The distance between the impulses increases thus with higher voltages and decreases with lower voltages. The output voltage U2 has then the form represented in FIG. 2b.

The block 2 acting as a ring counter is represented more fully, though only schematically, in FIG. 4, where all the less important parts have been omitted. This figure shows a six-stage shift register whose storage stages are designated with 21 to 26. When an impulse of the voltage U2 arrives, the storage stage 21 is at first opened, so that a voltage is formed, in the line 27. At the following impulse, this stage 21 is blocked again and the storage stage 22 is opened by this impulse by means of the voltage formed at the point 27. The voltage at the point 27 disappears again and another voltage, which is displaced by just one impulse, appears at the point 28. This continues in the same manner up to the storage stage 26, which works again back to stage 21 so that a ring counter is formed, where rectangular impulses displaced by the impulse width are formed in the lines 27, 28 etc. These rectangular impulses, which are now separated from each other, are fed to the multivibrator 30 in such manner that the multivibrator 30 becomes conductive by the voltage in the line 27 and produces a voltage U6'. To the same multivibrator 30 is also fed a voltage from the line 29 which makes, the multivibrator tip back into its initial position, so that the impulse U6' disappears. The duration of the voltage U6' is as long, as shown in FIG. 2c, as the three impulse distances. In the same manner, but displaced by two impluses, is then produced the voltage U6'' and again displaced by two impulses, the voltage U6'''.

Block 3 works in a similar manner as block 1, only that no variable voltage is supplied there. Consequently, the width of the impulse and the impulse frequency always remain constant. Block 4, whose inner circuit consists only of a resistance and of a rectifier, as already indicated in FIG. 1, acts as follows: The supply voltages U4 and U4' are negative. If the voltage U4 has a higher value than the voltage U4', the rectifier 42 can transmit current. The voltage U4' appears then also at the output. But if the voltage U4 is zero, the rectifier is blocked and no voltage appears at the output. One thus obtains the curve indicated in FIG. 2h. The higher U4' is, the higher will the voltage U5 be.

Block 5 is a filter which transforms the wavy D-C voltage U5 into a sinusoidal form. The circuit is not described in detail, since such circuits are generally known.

The mixer or gate circuit 6 is represented more fully in FIG. 5. The circuit is designed as a ring modulator. The voltage U6, that is, the sinusoidal voltage of different amplitude of equal frequency, is applied to the transformer 61. The voltage U6', that is, a rectangular voltage of different frequency but equal amplitude, arrives at the transformer 62. U6' is the control voltage and responsible that the voltage U6 passes unchanged or in opposite direction through the gate. On the transformer 61 are provided the rectifiers 63 for one direction and rectifiers 64 for the other direction; depending on the position of U6', a bias voltage is then formed which releases either the rectifiers 63 or the rectifiers 64. At the resistances 65 is then formed a voltage U7 which has divided the sinusoidal voltage U6 in a corresponding manner, independent of the frequency. The curve is represented in FIG. 2i. As a protection against short circuits, Zener diodes can be arranged ahead of the rectifier diodes, which are not represented here, however. Other arrangements for transmitting the voltage in positive or negative direction are also known and can be used for this purpose.

The block 7 is a filter of known design which transmits the difference between the frequencies produced in the blocks 2 and 5, but not their sum. It is thus a low-pass filter of known design. The sinusoidal voltage formed at the output is designated with U8 in FIG. 2k; it is frequency-and amplitude-dependent, as can be seen.

In conclusion, the illustrated arrangement, which naturally can be modified to replace certain components by other known and equivalent means, shows that it is possible to produce with strictly static means a frequency- and amplitude-dependent output curve at the rotary field transmitter, where the respective dependencies can be set independent of each other.

I claim:

1. Apparatus for producing frequency and amplitude dependent control voltages comprising, first means producing a first series of rectangular voltage impulses having a constant amplitude but variable frequency, means transforming said first series of rectangular voltage impulses into an $n$ number of voltage impulses displaced in phase by $360/n$ and which form a rotary field voltage, second means producing a second series of rectangular voltage impulses having a constant frequency but variable amplitude, means transforming said second series of rectangular voltage impulses into a single-phase sinusoidal voltage of the same constant frequency and variable amplitude, and means mixing said single-phase sinusoidal voltage with each of said phase displaced rotary field voltages to form an $n$-phase sinusoidal control voltage having a variable amplitude and a variable frequency equal to the difference between the respective frequencies of said single-phase sinusoidal voltage and said rotary field voltage.

2. Apparatus as defined in claim 1 for producing frequency and amplitude dependent control voltages wherein said first means producing said first series of rectangular voltage impulses is comprised of an integrator to which fixed and variable D.C. voltages are fed, diode means connected to the output from said integrator, and a multivibrator connected to the output of said diode means.

3. Apparatus as defined in claim 1 for producing frequency and amplitude dependent control voltages wherein said means for transforming said first series of rectangular voltage impulses into an $n$ number of voltage impulses displaced in phase by $360/n$ is constituted by a ring counter in the form of a shift register having a plurality of storage elements which are fed in succession by said first series of rectangular voltage impulses to thereby etablish the desired $n$-phase sequence.

4. Apparatus as defined in claim 1 for producing frequency and amplitude dependent control voltages wherein said mixing means are constituted by ring modulators.

5. Apparatus as defined in claim 1 for producing frequency and amplitude dependent control voltages wherein said mixing means are constituted by ring modulators, and a low pass filter is connected to the output from each ring modulator to filter out voltages representing the sum of the frequencies of said single-phase sinusoidal voltage and said rotary field voltage.

6. Apparatus as defined in claim 1 for producing frequency and amplitude dependent control voltages wherein said mixing means are constituted by gate circuits.

References Cited

UNITED STATES PATENTS

| 2,784,365 | 3/1957 | Fenemore et al. | 318—230 |
| 3,289,062 | 11/1966 | Dannettell | 318—231 X |

JOHN F. COUCH, *Primary Examiner.*

W. H. BEHA, *Assistant Examiner.*